United States Patent
Akagi et al.

(10) Patent No.: US 8,273,267 B2
(45) Date of Patent: Sep. 25, 2012

(54) METHOD FOR PRODUCING POSITIVE ELECTRODE ACTIVE MATERIAL FOR BATTERY

(75) Inventors: Ryuichi Akagi, Wakayama (JP); Kenichi Nishimura, Tokyo (JP); Yasuhisa Fukumoto, Wakayama (JP)

(73) Assignee: Kao Corporation, Tokyo (JP)

( * ) Notice: Subject to any disclaimer, the term of this patent is extended or adjusted under 35 U.S.C. 154(b) by 227 days.

(21) Appl. No.: 12/593,253

(22) PCT Filed: Apr. 7, 2008

(86) PCT No.: PCT/JP2008/056875
§ 371 (c)(1),
(2), (4) Date: Sep. 25, 2009

(87) PCT Pub. No.: WO2008/126823
PCT Pub. Date: Oct. 23, 2008

(65) Prior Publication Data
US 2010/0117031 A1 May 13, 2010

(30) Foreign Application Priority Data
Apr. 9, 2007 (JP) .................................. 2007-101414

(51) Int. Cl.
*H01B 1/00* (2006.01)
(52) U.S. Cl. ...................... 252/500; 252/182.1; 429/209; 429/221; 429/223; 429/231.1; 429/231.4; 429/231.8; 429/231.95
(58) Field of Classification Search ............... 252/182.1, 252/500; 429/209, 221, 223, 231.1, 231.4, 429/231.8, 231.95
See application file for complete search history.

(56) References Cited

U.S. PATENT DOCUMENTS

| 5,709,969 A | 1/1998 | Yamahira |
| 6,287,728 B1 | 9/2001 | Kajiura et al. |

(Continued)

FOREIGN PATENT DOCUMENTS

CN 1585187 A 2/2005
(Continued)

OTHER PUBLICATIONS

English translation of International Preliminary Report on Patentability (Form PCT/IB/338 and 373) and Written Opinion of the International Searching Authority (Form PCT/ISA/237) issued on Oct. 22. 2009 in PCT/JP2008/056875.

(Continued)

*Primary Examiner* — Khanh Tuan Nguyen
(74) *Attorney, Agent, or Firm* — Birch, Stewart, Kolasch & Birch, LLP

(57) ABSTRACT

It is an object of the present invention to provide a method for producing a positive electrode active material for a battery, which can realize easy regulation of pore size in porosity formation of a positive electrode active material and is less likely to undergo hindrance of ion conduction caused by residues and, thus, can realize excellent high-rate discharge characteristics, and a method for producing a composition for a battery using the positive electrode active material for the battery. The method for producing a positive electrode active material for a battery of the present invention is a method for producing a positive electrode active material for a battery, including: a step 1 of firing a mixture of a raw material for the positive electrode active material and carbon particles to remove the carbon particles; and a step 2 of milling and classifying a fired body obtained in the step 1.

9 Claims, 1 Drawing Sheet

U.S. PATENT DOCUMENTS

| | | |
|---|---|---|
| 7,217,406 B2 | 5/2007 | Tsukuma et al. |
| 2001/0019798 A1 | 9/2001 | Kajiura et al. |
| 2003/0129496 A1* | 7/2003 | Kasai et al. ............... 429/231.1 |
| 2006/0141361 A1 | 6/2006 | Yuasa et al. |

FOREIGN PATENT DOCUMENTS

| | | | |
|---|---|---|---|
| JP | 8-180904 A | 7/1996 |
| JP | 2000-164217 A | 6/2000 |
| JP | 2001-143687 A | 5/2001 |
| JP | 2002-104827 A | 4/2002 |
| JP | 2003-132882 A | 5/2003 |
| JP | 2004-83388 A | 3/2004 |
| JP | 2005-50684 A | 2/2005 |
| JP | 2005-158401 A | 6/2005 |
| JP | 2006-164859 A | 6/2006 |
| JP | 2008-63213 A | 3/2008 |
| WO | WO-98/28804 A1 | 7/1998 |

OTHER PUBLICATIONS

Chinese Notification of the First Office Action dated Oct. 25, 2011 for Chinese Application No. 200880009341.8.

Chinese Notification of the Second Office Action dated Jun. 5, 2012 for Chinese Application No. 200880009341.8.

* cited by examiner

METHOD FOR PRODUCING POSITIVE ELECTRODE ACTIVE MATERIAL FOR BATTERY

TECHNICAL FIELD

The present invention relates to a method for producing a positive electrode active material for a battery for obtaining a positive electrode active material having excellent discharge characteristics for the battery, and a method for producing a composition for a battery using the positive electrode active material for the battery. Particularly, the present invention is useful as a method for producing lithium manganate or the like which can be appropriately used as a positive electrode active material of a lithium battery.

BACKGROUND ART

A non-aqueous electrolyte secondary battery, which has features of a higher operating voltage and higher energy density than that of a conventional nickel cadmium secondary battery or the like, has been widely used as a power source of an electronic device. Lithium transition metal composite oxides represented by lithium cobaltate, lithium nickelate and lithium manganate or the like are used as a positive electrode active material of the non-aqueous electrolyte secondary battery.

Among these, lithium manganate has advantages of easily obtaining a raw material inexpensively since a large amount of manganese which is a constituent element exists as resources and applying little load to environment. Thereby, the non-aqueous electrolyte secondary battery using lithium manganate has been conventionally used for the application of a mobile electronic device represented by a mobile phone, a notebook computer and a digital camera or the like.

In recent years, in the mobile electronic device, the demand characteristics of the non-aqueous electrolyte secondary battery have been further increased, due to the function advancement such as the application of various functions, and use at high temperature and low temperature, or the like. The non-aqueous electrolyte secondary battery is expected to be applied to power supplies such as batteries for electric automobiles, and the battery which can follow an abrupt start and abrupt acceleration of automobiles and enables high output high-rate discharge is desired.

Therefore, an attempt has been made to make the average particle diameter of the positive electrode active material such as lithium manganate small so as to enhance the smooth insertion/desorption capacity of Li ions. For example, the following Patent Document 1 discloses a method which uses manganese oxide having an average primary particle diameter of 0.01 to 0.2 µm, mixing manganese oxide with a lithium compound or the like and firing them, and then milling them to produce lithium manganate having an average primary particle diameter of 0.01 to 0.2 µm and an average secondary particle diameter of 0.2 to 100 µm.

However, a diffusion space sufficient for the insertion and desorption of Li ions is hard to be obtained only by making the average particle diameter of the positive electrode active material small, or by controlling the average particle diameter of aggregated particles as in the above-mentioned producing method. When the positive electrode is produced using the positive electrode active material, unfortunately, the diffusion space of the Li ions is hard to be stably secured by the mixture and pasting of a binder or the like.

Therefore, an attempt exists, which positively forms a space other than a space generated in a clearance between particles in a positive electrode active material in order to expand the diffusion space of the Li ions, thereby making the positive electrode active material porous.

For example, the following Patent Document 2 discloses a producing method of a positive electrode active material for producing a mixture containing primary particles in a lithium-containing composite oxide and pore-forming particles, then removing a pore-forming particle construction material contained in the mixture to form porous particles. In addition, Patent Document 2 discloses a method for using resins such as polystyrene as the pore-forming particles, and heating the resins to 300 to 600° C. to thermally decompose the resins to remove a part thereof.

Furthermore, the following Patent Document 3 discloses lithium manganese composite oxide granulated secondary particles obtained by granulating slurry obtained by dispersing a manganese oxide fine powder, a lithium raw material and an open pore forming agent by spray drying and thereafter firing the granulated object at 700 to 900° C.

Patent Document 1: Japanese Unexamined Patent Publication No. 2002-104827
Patent Document 2: Japanese Unexamined Patent Publication No. 2005-158401
Patent Document 3: Japanese Unexamined Patent Publication No. 2004-083388

DISCLOSURE OF THE INVENTION

Problems to be Solved by the Invention

However, in the producing method of Patent Document 2, positive electrode active materials are bound by thermally decomposing resin as pore-forming particles to partially leave the resin. It was found that the resin or the like is easily left also on the surface of the positive electrode active material and the left component easily hinders insertion and desorption of Li ions easily on the surface of the positive electrode active material. When the granulated powder of Patent Document 3 constitutes the positive electrode composition, the binder was expected to permeate to the pores in the granulated powder to hinder the insertion/release of the Li ions.

Therefore, it is an object of the present invention to provide a method for producing a positive electrode active material for a battery, which can realize easy regulation of pore size in porosity formation of a positive electrode active material and is less likely to undergo hindrance of ion conduction caused by residues and, thus, can realize excellent high-rate discharge characteristics, and a method for producing a composition for a battery using the positive electrode active material for the battery.

Means for Solving the Problems

First, a general structure and operation mechanism of a non-aqueous electrolyte secondary battery will be described using a lithium secondary battery as example. The lithium ion secondary battery, which uses an electrolysis solution containing a nonaqueous solvent containing lithium salts, has a structure where a positive electrode and a negative electrode are separated by a separator, the positive electrode provided with a positive electrode active material, the negative electrode provided with a negative electrode active material. Alternatively, since the conductivity of the positive electrode active material itself in the positive electrode is low, conductive materials such as carbon black are added in order to enhance the conductivity.

The above positive electrodes are generally produced by applying a slurry obtained by mixing active materials such as $LiMn_2O_4$, conductive materials such as carbon black, a binder, and a solvent onto a metallic foil as a current collector and drying the slurry. As a result, the fine structure of the positive electrode has a structure where particles made of a positive electrode active material having low conductivity and particles made of a conductive material having a particle diameter smaller than that of the particles made of the positive electrode active material are dispersed and combined.

In the positive electrode of the lithium ion secondary battery, lithium ions are stored in the positive electrode active material in discharging. In that case, electric discharge is advanced by the operation of lithium ions diffused to the positive electrode side and electrons electrically conducted from a positive electrode current collector. Alternatively, the electrons and lithium ions are released from the positive electrode active material in charging. Therefore, the selection of a conductive material having high conductivity and the fine composite structure of the positive electrode active material as factors which affect the characteristics, particularly high-rate discharge characteristics (high output) of the battery are very important.

As described above, the positive electrode active material for the battery of the present invention, which is a positive electrode structure material of the non-aqueous electrolyte secondary battery, means a substance absorbing and releasing metal ions in an electrolytic solution in charge and discharge.

The present inventors have found that easy regulation of pore size can be realized by removing carbon particles mixed in a raw material for a positive electrode active material in firing, and a positive electrode active material for a battery having excellent high-rate discharge characteristics can be obtained. As a result, the present invention has been perfected.

Namely, the method for producing a positive electrode active material for a battery of the present invention is a method for producing a positive electrode active material for a battery, including: a step 1 of firing a mixture of a raw material for the positive electrode active material and carbon particles to remove the carbon particles; and a step 2 of milling and classifying a fired body obtained in the step 1.

Also, the method for producing a composition for a battery of the present invention is a method for producing a composition for a battery, including a step of preparing slurry obtained by mixing the positive electrode active material for the battery obtained by the above-mentioned method for producing the positive electrode active material for the battery, a conductive material, a binder and a solvent.

BEST MODE FOR CARRYING OUT THE INVENTION

Figure 1:
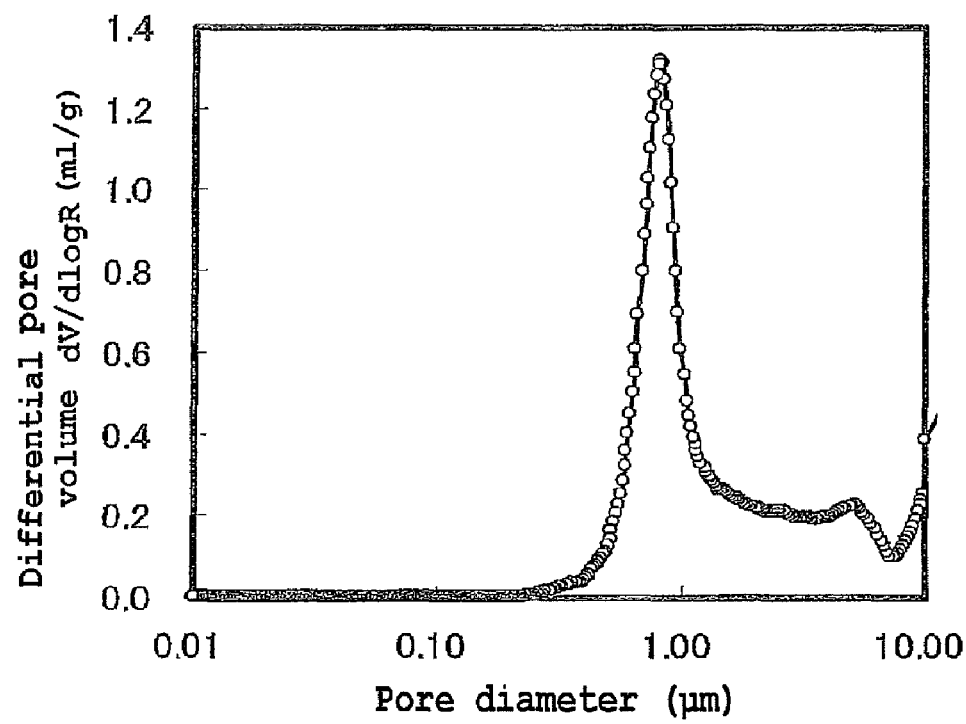
FIG. 1 is a graph of a pore distribution of an active material sintered body finally obtained in Example 3.

Preferable examples of the positive electrode active materials for the battery (hereinafter, also referred to as positive electrode active materials) include manganese oxide ($MnO_2$ or the like), titanium sulfide ($TiS_2$ or the like), molybdenum sulfide ($MoS_2$ or the like) and vanadium oxide ($\alpha$-$V_2O_5$ or the like) in view of having a high potential to secure output characteristics. The other examples thereof include Li—Mn-based composite oxides such as lithium manganate ($LiMn_2O_4$ or the like), Li—Co-based composite oxides such as lithium cobaltate ($LiCoO_2$ or the like), Li—Ni-based composite oxides such as lithium nickelate ($LiNiO_2$ or the like), and Li—Fe-based composite oxides such as lithium ferrate ($LiFeO_2$ or the like) capable of releasing lithium ions. Among these, lithium cobaltate, lithium nickelate and lithium manganate are preferable in view of excellent thermal stability, capacity and output characteristics, and lithium manganate is more preferable.

The crystal phase of the obtained lithium manganate is preferably a spinel type as a positive electrode active material for a lithium battery. Specifically, a main peak obtained by X-ray diffraction measurement may correspond to or be equivalent to $LiMn_2O_4$ shown in JCPDS (Joint committee on powder diffraction standards): No. 35-782.

A method for producing a positive electrode active material for a battery of the present invention includes a step 1 of firing a mixture of a raw material for a positive electrode active material and carbon particles to remove the carbon particles; and a step 2 of milling and classifying a fired body obtained in the step 1. The obtained fired body is preferably porous in order to secure the positive electrode active material having good charge and discharge characteristics. From such a viewpoint, it is preferable that a large number of carbon particles exist in the mixture. It is believed that the use of residual carbon particles can contribute to the formation of a conductive path as a conductive material even when the carbon particles are not perfectly removed.

According to the method for producing the positive electrode active material for the battery of the present invention, it is believed that the carbon particles mixed in the raw material for the positive electrode active material are fired and removed to easily form pores in the removed portion, and thus, the positive electrode active material is made porous. Furthermore, it is believed that the dimension of the milled particles is great even when the porous structure is partially broken in the step of milling and classifying the obtained fired body, and thereby the pore size is easily controlled. In addition, it is believed that ion conduction is hard to be hindered even if the carbon particles are left since the carbon particles are removed. Thereby, it is believed that the positive electrode active material for the battery having excellent high-rate discharge characteristics is obtained.

The raw material for the positive electrode active material may be precursor particles or a mixture of the precursor particles fired to generate the positive electrode active material described above besides the particles of the positive electrode active material described above. Examples of the mixtures of the precursor particles of the above-mentioned positive electrode active material include the combination of manganese oxide particles and lithium compound particles.

As the manganese oxide as the precursor particles, one or two kinds or more of $MnO$, $Mn_3O_4$, $Mn_2O_3$ and $MnO_2$ are preferably used. Among these, $MnO_2$ and $Mn_2O_3$ are particularly preferably used. As a lithium compound, lithium carbonate, lithium hydroxide, lithium oxide, lithium nitrate, lithium acetate and lithium sulfate or the like are preferable. Among these, lithium carbonate is preferably used in view of the easy control of primary particles of lithium manganate finally obtained.

Examples of the precursor particles which independently generate the positive electrode active material described above include precursor particles made of lithium manganate, lithium cobaltate, lithium nickelate and lithium ferrate or the like.

In view of securing high output characteristics, the average particle diameter of the raw material for the positive electrode active material such as the raw material particles for the positive electrode active material and the precursor particles is preferably 0.1 to 2 μm, more preferably 0.3 to 1.5 μm and still more preferably 0.5 to 1.2 μm.

The average particle diameter of the raw material for the positive electrode active material can be adjusted by dry-milling. However, the raw material for the positive electrode active material is preferably wet-milled in the presence of a solvent. Ball medium type mills such as a wet bead mill, a ball mill, At liter and a vibration mill are preferably used for wet-milling.

In view of ease in drying, the boiling point of the solvent used for wet-milling is preferably not more than 100° C., more preferably not more than 90° C., and still more preferably not more than 80° C. Specific examples of such solvents include water, ethanol, acetone, methyl ethyl ketone, toluene and tetrahydrofuran or the like.

As the concentration of the raw material for the positive electrode active material in wet-milling, the solid content is preferably not less than 1% by weight in view of productivity, more preferably not less than 2% by weight, and still more preferably not less than 5% by weight. The solid content is preferably not more than 70% by weight in view of the milling efficiency of slurry, more preferably not more than 60% by weight, and still more preferably not more than 50% by weight.

A dispersing agent may be added in order to enhance milling efficiency in wet-milling. When the dispersing agent is used, an anionic, nonionic or cationic surfactant, or a polymer dispersing agent can be used as the dispersing agent. However, the polymer dispersing agent is preferably used in terms of dispersion performance.

In the invention, the mixture of the raw material for the positive electrode active material and carbon particles is fired to remove the carbon particles in the step of removing the carbon particles. Particularly, for example, the mixture is preferably fired according to a firing condition to be described later to sinter the positive electrode active material particles and remove the carbon particles to make the mixture porous in parallel. It is believed that such firing treatment enhances the crystallinity of the obtained positive electrode active material, and, for example, easily expresses the insertion/desorption function of Li ions of lithium manganate and can enhance the high-rate discharge characteristics.

The carbon particles easily employing a structure are preferable in view of securing the pore diameter and the pore volume. For example, a carbon fiber made from a polymer represented by polyacrylonitrile (PAN), a pitch-based carbon fiber made from pitch, a vapor-grown carbon fiber (VGCF) made from hydrocarbon gas, and so-called carbon nanotube obtained by an arc discharge method, a laser vaporization method, and a chemical vapor deposition method or the like, active carbon and carbon black are preferable. Carbon black is more preferable.

Carbon black produced by any producing methods of decomposing methods such as a thermal black method and an acetylene black method, incomplete combustion methods such as a channel black method, a gas furnace black method, an oil furnace black method, a turpentine method and a lamp black method can be used. Furnace black, acetylene black and Ketjenblack are preferably used. These may be singly used, or may be mixed in the form of a combination of two or more members. The carbon particles are present in a state where the particles are fused (referred to as aggregate and conceptually compared to the fringe of a grape). The developing degree of this aggregate is referred to as a structure.

The average particle diameter of the carbon particles is preferably 0.1 to 10 μm in view of appropriately securing the pore diameter after the removal of the carbon particles in firing, more preferably 0.5 to 8 μm, and still more preferably 1 to 5 μm.

The average particle diameter of the carbon particles can be adjusted by, for example, crushing or milling carbon black which is the aggregate, or milling the carbon fiber and carbon nanotube or the like. Both wet and dry crushing or milling can be performed.

The content of the carbon particles in the mixture is preferably 0.1 to 30% by weight in views of appropriately securing the pore diameter and of securing the sufficient sintering of the positive electrode active material particles, more preferably 1 to 16% by weight, and still more preferably 2 to 10% by weight.

The removal of the carbon particles by firing is a method for chemically reacting the carbon particles with gas to evaporate a reaction product. A method for heating the carbon particles in the presence of oxygen to oxidize and evaporate the carbon particles is preferable.

When the carbon particles are mixed in the raw material for the positive electrode active material, the raw material for the positive electrode active material and the carbon particles can be mixed by wet-mixing, dry-mixing or the like. However, the wet-mixing is preferably performed in view of uniformly mixing the carbon particles efficiently.

Specifically, it is preferable that the raw material particles for the positive electrode active material and the carbon particles are dispersed and mixed in the solvent and the solvent is then removed to obtain the mixture. The raw material particles for the positive electrode active material and the carbon particles may be dispersed once and then mixed, or may be mixed while being dispersed. Specifically, the raw material particles for the positive electrode active material and the carbon particles can be dispersed and mixed by a method for dispersing and mixing the carbon particles in a dispersion liquid of the raw material particles for the positive electrode active material obtained by wet-milling, a method for mixing the dispersion liquid of the carbon particles in the dispersion liquid of the raw material particles for the positive electrode active material obtained by wet-milling, and a method for mixing the dry-milled raw material particles for the positive electrode active material in the dispersion liquid of the carbon particles, or the like.

The solvent may be removed by any of drying under reduced pressure, drying by heating, vacuum drying, spray drying, static drying, flow drying, hot air drying and the combination thereof or the like. However, the drying under reduced pressure, the vacuum drying or the combination thereof is preferable since they can perform rotation operation or the like in order to maintain a more uniform composition of the obtained composite particles (mixture).

A drying temperature is not particularly limited. However, in view of completely removing the solvent from the obtained composite particles (mixture), the drying temperature is preferably 30 to 120° C., and more preferably 50 to 80° C.

The above-mentioned mixture is then fired. In view of easily adjusting the average particle diameter after firing, it is preferable that the above-mentioned mixture is previously crushed or lightly milled. In that case, it is preferred that the mixture is crushed or lightly milled by dry treatment in view of maintaining the composite structure of the mixture. Such treatment can be performed by the crushing using a mortar and by using a commercially available coffee mill and mixer or the like.

The carbon particles are removed by firing the mixture in the present invention. The term "firing" means heat-treating (annealing) to a level of the positive electrode active material to be sintered. Thereby, the crystallinity of the positive electrode active material is enhanced to enhance the high-rate discharge characteristics. The positive electrode active material cured in a porous state can be obtained by the firing. Herein, the sintering means a bonding reaction caused by a pure solid phase or a partial liquid phase between solids when the assembly of mixed mineral powders is heated and the powder particles are bonded by the bonding reaction (Chemical Exhaustive Dictionary 4 (Oct. 15, 1981, issue)). In the present invention, the mixture of the raw material for the positive electrode active material and carbon particles is preferably fired until the positive electrode active material is sintered to be in any of the following states.

(1) The porous positive electrode active material or the milled object thereof is made of the constituent elements of the raw material for the positive electrode active material.

(2) The full width at half maximum of the diffraction peak of a (111) plane attributed to lithium manganate of the porous positive electrode active material or the milled object is not more than 2.5.

(3) When the porous positive electrode active material or the milled object thereof is heated (in the air) at 600° C. for 1 hour, the weight reduction (change) thereof is less than 1%.

In diffraction data measured by powder X-ray diffraction measurement, the full width at half maximum herein means the full width at half maximum of the strongest diffraction peak and means a value digitized by a measuring method and a fitting method to be described later. For example, the full width at half maximum means a value obtained by digitalizing a diffraction peak attributed to a (111) plane of lithium manganate ($LiMn_2O_4$) a (104) plane of lithium cobaltate ($LiCoO_2$) and a (003) plane of lithium nickelate ($LiNiO_2$) according to the method to be described later.

When the inner temperature of a furnace in which the mixture is placed reaches T° C. at the average temperature rising rate of t° C./hour, and the mixture is then fired at T° C. for H hours, as the appropriate firing condition, t, T and H satisfy the following contents in views of properly removing the carbon particles and of sufficiently sintering the positive electrode active material.

That is, preferably, t=200 to 800, T=650 to 1200, and H=[$4000/10^{(1+T/273)}$] to [$204000/10^{(1+T/273)}$], more preferably, t=300 to 700, T=650 to 1000, and H=[$4000/10^{(1+T/273)}$] to [$180000/10^{(1+T/273)}$], still more preferably t=300 to 600, T=700 to 900, and H=[$8500/10^{(1+T/273)}$] to [$128000/10^{(1+T/273)}$] particularly preferably t=300 to 500, T=700 to 850, and H=[$17000/10^{(1+T/273)}$] to [$8500/10^{(1+T/273)}$].

It is preferable that H does not exceed 20 in view of securing productivity. It is more preferable that H does not exceed 10. It is still more preferable that H does not exceed 6.

Note that, in the firing property of the active material, it is empirically known that H is preferably enlarged when T is low, and when T is high, the firing property of the active material can be sufficiently secured even if H is small. The present inventors found that such relationship between T and H is appropriately applied by a product [$10^{(1+T/273)}$]×H and appropriate H to fixed T can be obtained by satisfying the appropriate range of the product.

For example, the good sintering state can be obtained by selecting H which satisfies the product=4000 to 204000 in t=200 to 800 and T=650 to 1200.

It is preferable to fire the active material while supplying gas such as air and oxygen in firing atmosphere, the gas reacted with the carbon particles at high temperature to evaporate a product in the step of removing the carbon particles by firing.

The fired body obtained by firing can be used as the positive electrode active material for the battery as it is. However, the present invention includes the step of milling and classifying the fired body so as to have a predetermined average particle diameter. The average particle diameter of the raw material for the positive electrode active material and the average particle diameter of the carbon particles or the like are desirably adjusted so that the pore diameter of the fired body is preferably 0.3 to 5 μm, and more preferably 0.5 to 2 μm, and the total pore volume is preferably 0.1 to 1 cc/g, and more preferably 0.35 to 0.7 cc/g. The average particle diameter of the carbon particles may be increased in order to increase the pore diameter of the fired body. The content of the carbon particles may be increased or the fired body may be fired on the appropriate firing condition described above in order to increase the pore volume.

That is, it is preferable that the fired body obtained by the producing method of the present invention has the following property. A ratio d2/d1 of the average particle diameter d1 of the positive electrode active material particles used as a raw material and the pore diameter d2 of the obtained fired body is preferably 1 to 50 in view of attaining the smooth movement of the Li ions, more preferably 1.2 to 20, still more preferably 1.2 to 10, still more preferably 1.2 to 5, and particularly preferably 1.2 to 3.

From the same viewpoint, for the pore diameter of the positive electrode active material for the battery, a peak pore diameter (hereinafter, also referred to as maximum peak pore diameter) which provides a maximum differential pore volume value in a pore diameter range of 0.01 to 10 μm in a pore distribution measured by a mercury porosimeter is preferably 0.3 to 5 μm. Any peak, which provides a differential pore volume value of not less than 10% of the maximum differential pore volume value, is preferably not present on a smaller pore diameter side than the maximum peak pore diameter in the pore distribution Herein, when a pore diameter is defined as R, and the total volume of the pores having a diameter of not less than the pore diameter is defined as V, a "differential pore volume" means a value (a value of dV/dlogR) obtained by differentiating the total volume V by logarithm logR of the pore diameter R. Note that the "peak" described above includes a shoulder peak. Hereinafter, it is the same as above.

The control of the maximum peak pore diameter in the preferable range can be realized by adjusting the average particle diameter, compounding ratio, firing temperature or firing time of carbon particles mixed in the positive electrode active material in, for example, a producing method to be described above. That is, the greater the average particle diameter and the compounding ratio of the carbon particles are, the maximum peak pore diameter tends to increase. The higher the firing temperature is and the longer the firing time is, the maximum peak pore diameter tends to decrease.

The "maximum differential pore volume value" means the maximum differential pore volume value in the pore diameter range of 0.01 to 10 μm. The "maximum peak pore diameter" means the pore diameter which provides the maximum differential pore volume value. In view of securing the high-rate discharge characteristics of the lithium battery, it is preferable that any peak pore diameter, which provides a differential pore volume value of not less than 10% of the maximum differential pore volume value, is not present on a smaller pore diameter side than the maximum peak pore diameter. It is more preferable that any peak pore diameter, which provides the differential pore volume value of not less than 8% of the maximum differential pore volume value, is not present. It is still more preferable that any peak pore diameter, which provides the differential pore volume value of not less than 5% is not present. From the same viewpoint, the maximum peak pore diameter is preferably 0.3 to 5 μm, more preferably 0.4 to 5 μm, still more preferably 0.5 to 5 μm, still more preferably 0.5 to 2 μm, and particularly preferably 0.5 to 1.5 μm. From the same viewpoint, the maximum differential pore volume value is preferably 0.3 to 10 ml/g, more preferably 0.5 to 10 ml/g, still more preferably 0.6 to 10 ml/g, still more preferably 0.8 to 10 ml/g and still more preferably 0.8 to 5 ml/g. It is believed that the preferred modes of the maximum peak pore diameter and maximum differential pore volume value described above are reflected to be a pore diameter (uniform pore diameter) appropriate for the smooth movement of the Li ions and the high-rate discharge characteristics of the lithium battery can be appropriately secured. It is believed that factors (for example, a binder permeating to the pores of the sintered body or the like) which hinder the insertion/release of the Li ions can be reduced by satisfying the above condition when the coating paste is prepared using the positive electrode active material for the battery obtained in the present invention. Furthermore, when the coating paste is coated on the collector, the increase in viscosity and the coating defect of the paste caused by the absorption or adsorption of the solvent and binder into the positive electrode active material for the battery can be prevented.

In order to secure the preferred aspects of the maximum peak pore diameter and maximum differential pore volume value, the particle diameter distribution of the raw material particles for the positive electrode active material is narrow and the average particle diameter thereof is preferably 0.1 to 2 μm, more preferably 0.3 to 1.5 μm, and still more preferably 0.5 to 1.2 μm. Similarly, in order to secure the preferred aspects of the maximum peak pore diameter and maximum differential pore volume value, in the producing method to be described above, it is preferable that the particle diameter distribution of the carbon particles mixed in the positive electrode active material is narrow and the average particle diameter thereof is 0.1 to 10 μm, more preferably 0.5 to 8 μm, and still more preferably 1 to 5 μm.

The peak pore diameter may be present on a larger pore diameter side than the maximum peak pore diameter. However, it is believed that this peak is derived from the distribution of the size of sintered active material particles. Therefore, in order to obtain the assembly of the sintered active material particles having a uniform particle size, the differential pore volume value of the peak pore diameter is preferably not more than 30% of the maximum differential pore volume value on a larger pore diameter side than the maximum peak pore diameter, more preferably not more than 20%, and still more preferably not more than 10%.

In the present invention, it is believed that the sintered active material particles having no pore themselves are easily obtained by milling and classifying the fired body to adjust the particle diameter. When the assembly (that is, the assembly as the measuring object of pore distribution) of the sintered active material particles having no pore is measured by the mercury porosimeter, only peaks equivalent to voids between the particles are obtained. On the other hand, since the sintered active material particles produced by spray drying are not further milled in the usual case, the sintered active material particles have pores themselves. In this case, when the assembly of the sintered active material particles having the pores is measured by the mercury porosimeter, two peaks of a first peak equivalent to the voids between the particles and a second peak which is equivalent to minute pores of the particles themselves on a smaller pore diameter side than the pore diameter of the first peak are obtained. When the coating paste is prepared using the sintered active material particles having such two peaks, the binder may permeate to the minute pores of the particles themselves to hinder the insertion/release of the Li ions.

The BET specific surface area of the positive electrode active material is preferably not less than 1 $m^2/g$ in view of the permeability of an electrolytic solution. The BET specific surface area is preferably not more than 10 $m^2/g$ in view of reducing the amount of the binder when producing a positive electrode.

Furthermore, in view of the balance between porosity required for the movement of the Li ions and energy density, the total pore volume of the positive electrode active material measured by the mercury porosimeter is preferably 0.1 to 1 cc/g, and more preferably 0.35 to 0.7 cc/g.

In the present invention, the obtained fired body is milled and classified. In this case, in views of enhancing the insertion/desorption capacity of the Li ions in order to be used for producing a positive electrode for a battery and of maintaining the smoothness of a coating film, the fired body is desirably milled and classified to adjust the average particle diameter so that the average particle diameter is preferably 1 to 10 times as large as the pore diameter, more preferably 1.5 to 8 times, and still more preferably 2 to 5 times. Herein, "milling" includes light milling and crushing as a general term.

As a method for adjusting the average particle diameter of the positive electrode active material to such a range, a method for crushing or milling the fired positive electrode active material in wet or dry treatment, and further classifying the obtained particles can be exemplified.

When the wet treatment is performed, the positive electrode active material is added into the same solvent as the above-mentioned solvent so that the concentration thereof is 5 to 30% by weight. The obtained solution is preferably irradiated with ultrasonic wave (rated output: 50 to 3000 W, oscillating frequency: 10 to 30 kHz) by an ultrasonic homogenizer for 30 seconds to 10 minutes, and more preferably for 30 seconds to 3 minutes. The solvent may be then removed by evaporation or the like.

When the dry treatment is performed, the positive electrode active material may be milled by a rotor speed mill ("P-14" manufactured by Fritsch Co.) with the number of rotations preferably set to a range of 6000 to 20000 rpm and more preferably a range of 6000 to 15000 rpm, and sieve ring mesh condition of 0.08 to 6.0 mm.

In view of enhancing crystallinity to enhance high-rate discharge characteristics, the full width at half maximum of the X diffraction peak of the positive electrode active material obtained in the present invention is preferably 0.12 to 0.3, more preferably 0.12 to 0.2, still more preferably 0.13 to 0.2, still more preferably 0.13 to 0.19, and particularly preferably 0.13 to 0.18 as a value obtained by a method described in Examples. The appropriate full width at half maximum is obtained by selecting the appropriate range described above as the firing condition and firing the raw material for the positive electrode active material so that the active material is sintered.

The positive electrode active material such as lithium manganate obtained in the present invention can be appropriately used as the positive electrode active material of the lithium battery. Therefore, the method for producing the composition for the battery of the present invention has the step of preparing slurry obtained by mixing the positive electrode active material for the battery obtained in the method for producing the positive electrode active material for the battery, the conductive material, the binder and the solvent. The positive electrode for the lithium battery can be produced by applying such slurry (hereinafter, also referred to as a coating paste) onto a metallic foil as the collector, and drying the slurry. This is laminated with a negative electrode and a separator, and an electrolyte liquid is injected to produce a lithium battery. In views of realizing the smoothness of a coated surface and making a coating thickness constant, it is preferable that the coating paste has a viscosity of 2000 to 9000 cps, more preferably 3000 to 8000 cps, and still more preferably 3500 to 7500 cps.

Any of conventional binders used for forming the positive electrode can be used as the binder. Polyvinylidene fluoride, polyamide imide, polytetrafluoroethylene, polyethylene, polypropylene and polymethylmethacrylate or the like can be suitably used.

As the solvent, any of conventional solvents used for forming the positive electrode can be used. For example, N-methylpyrrolidone (NMP), dimethylformamide (DMF), dimethylacetamide, methyl ethyl ketone, tetrahydrofuran, acetone, ethanol and ethyl acetate or the like are appropriately used. Any of conventionally known additive agents used for forming the positive electrode can be added into the slurry.

The lithium battery produced using the positive electrode active material obtained in the present invention has excellent high-rate discharge characteristics. For the high-rate discharge characteristics, in evaluation of battery characteristics to be described later, a ratio of an discharge amount of 60 C based on 1 C is preferably not less than 75%, more preferably not less than 80%, still more preferably not less than 85%, and particularly preferably not less than 90%.

The application of the lithium battery is not particularly limited. For example, the lithium battery can be used for electronic devices such as a notebook computer, an electronic book player, a DVD player, a portable audio player, a video movie, a portable TV and a mobile phone. In addition, the lithium battery can be also used for consumer devices such as a battery for a cordless cleaner, a cordless power tool, an electric vehicle and a hybrid vehicle or the like, and an auxiliary power of a fuel cell vehicle. Among these, the lithium battery is appropriately used as the battery for a vehicle particularly requiring high output.

Hereinafter, Examples or the like specifically showing the present invention will be described. Evaluation items in Examples or the like were measured as follows.

(1) Average Particle Diameter

For the average particle diameter of carbon particles, a laser diffraction/dispersion type particle distribution measurement device LA750 (manufactured by Horiba, Ltd.) was used, and ethanol was used as a disperse medium. Slurry of 3 g of carbon particles lightly crushed in a mortar/280 g of ethanol was irradiated with ultrasonic wave for 1 minute and the particle size distribution of the slurry was then measured at a relative refractive index of 1.5. The measured value of a volume median particle diameter (D50) was defined as the average particle diameter of the carbon particles.

For the average particle diameter (d1) of the raw material particles for a positive electrode active material constituting the raw material for the positive electrode active material, a laser diffraction/dispersion type particle distribution measurement device LA750 (manufactured by Horiba, Ltd.) was used, and ethanol was used as a disperse medium. Slurry of 15 g of a raw material for a positive electrode active material/85 g of ethanol was irradiated with ultrasonic wave for 1 minute and the particle size distribution of the slurry was then measured at a relative refractive index of 1.7. The measured value of a volume median particle diameter (D50) was defined as the average particle diameter of raw material particles for the positive electrode active material.

(2) Measurement of Pore Diameter and Total Pore Volume

A pore volume of a pore diameter range of 0.008 µm to 200 µm was measured by using a mercury intrusion pore size distribution measurement device (Shimadzu Poresizer 9320). The integrated value was defined as the pore volume of the sample. The pore diameter of the peak top of the maximum peak of peaks of the pore distribution obtained by the measurement was defined as the pore diameter (d2) of the sample.

(3) BET Specific Surface Area

A BET specific surface area was measured by a nitrogen gas adsorption method using a specific surface area measurement device (Shimadzu Flow Sorb III 2305).

(4) Measurement of Full Width at Half Maximum of X-Ray Diffraction Peak

Positive electrode active materials contained in composite particles and fired bodies obtained by firing composite particles were used as samples. The samples were measured by using an X-ray diffractometer (RINT2500 manufactured by Rigaku Corporation) under the conditions of X-ray output: 40 kV, 120 mA; divergence slit: 1°, receiving slit: 0.3 mm, scattering slit: 1° used as irradiating slits; and scanning rate: 2° (2θ) per minute. The fitting of the diffraction peak of a (111) plane attributed to lithium manganate was performed by the pseudo-Voight function (Laurence component ratio: 0.5) to digitize a full width at half maximum. The fitting was performed by using software JADE (version 5.0) manufactured by MDI Company.

(5) Constituent Elements of Positive Electrode Active Material Fired Body 1 g of the obtained positive electrode active material fired body was decomposed in sulfuric and nitric acids. Lithium and manganese of the constituent elements of the positive electrode active material fired body were then measured by an ICP analytical device. Oxygen was measured by using an oxygen analyzer. Carbon was measured by using a CHN meter.

(6) Weight Change after Heated at 600° C. for 1 Hour

The weight change when 1 g of the obtained positive electrode active material fired body was heated at 600° C. in the air for 1 hour was measured, and the weight change rate (=(weight before heated−weight after heated)/weight before heated×100) was obtained. 1 g of the positive electrode active material fired body was used and measured. An electric furnace (MS electric furnace SLA-2025D (production number: MS-0435) manufactured by Motoyama Co., Ltd.) was used for heating. The positive electrode active material fired body was heated under the conditions of an average temperature rising rate of 300° C./hour and an average temperature falling rate of 100° C./hour. The positive electrode active material fired body was heated while flowing 5 L/min of air into a furnace.

(7) High-Rate Charge and Discharge Test 1 part by weight of a PVDF powder (#1300 produced by Kureha Chemical Industry Co., Ltd.), 1 part by weight of carbon black (HS-100 produced by Denki Kagaku Kogyo K.K.) used as a conductive agent, and N-methyl-2-pyrrolidone as a solvent were added into 8 parts by weight of the sample. In this case, the total amount of the sample, PVDF powder, carbon black and N-methyl-2-pyrrolidone based on 8 parts by weight of the sample was set to 25 parts by weight.

These were uniformly mixed to prepare a coating paste. Solid content concentration (hereinafter, also referred to as the concentration of the coating paste) other than the solvent of the coating paste was 40% by weight. The paste was uniformly coated in a range of 15 cm width by 15 cm length on an aluminum foil (the thickness: 20 μm) used as a collector by a YBA type baker applicator (Yoshimitsu Seiki Co., Ltd.), and dried for 10 minutes or more at 140° C. The gap of the applicator was appropriately set to 200 to 250 μm according to the concentration and viscosity of the paste. After the paste was dried, the obtained dried object was formed so as to have a uniform film thickness by a pressing machine, and cut in a predetermined size (20 mm×15 mm) to provide a test positive electrode. The thickness of the electrode active material layer was 25 μm. A test cell was produced using the above-mentioned test positive electrode. A metallic lithium foil was cut to a predetermined size and the cut metallic lithium foil was used for a negative electrode. Celgard #2400 was used for a separator. An electrolytic solution obtained by dissolving $LiPF_6$ at the concentration of 1 mol/l in an ethylene carbonate/diethyl carbonate (1:1 vol %) solvent was used. The test cell was assembled in a glove box under argon atmosphere. After the assembly of the test cell, the test cell was left at 25° C. for 24 hours, and high-rate charge and discharge characteristics to be shown below were then evaluated. The viscosity of the coating paste was measured at 25° C. using a Brookfield type viscometer (manufactured by Brookfield Company, type: LVT, rotor: No. 4, number of rotations: 60 rpm).

The test cell was charged and discharged with a constant current of 0.2 C. Then, a ratio of (1) a capacity (A) of the test cell charged with a constant current of 0.5 C and then discharged with a constant current of 1 C and (2) a capacity (B) of the test cell charged with a constant current of 0.5 C and then discharged with a constant current of 60 C was defined as high-rate discharge characteristics.

High-rate discharge characteristics(%)=$B/A$×100

Example 1

Adjustment of Average Particle Diameter of Raw Material for Positive Electrode Active Material Aggregated particles (average particle diameter: 3 μm) of lithium manganate, confirmed to have a single phase since the aggregated particles corresponded to JCPDS: No. 35-782 according to X-ray diffraction, were subjected to atomization treatment in a wet mill. In this case, as the wet milling mill, Dyno Mill KDL-PILOT A TYPE (content volume: 1.4 L, manufactured by Shinmaru Enterprises Corporation) was used. 4.28 kg of zirconia beads having a diameter of 0.2 mm was used. A mixture of 300 g of aggregated particles of the lithium manganate and 1700 g of ethanol was milled for 30 minutes under the condition of number of rotations of 1900 rpm while being circulated at a flow velocity of 400 g/min. The average particle diameter of the mixture after milling was 0.5 μm.

(Mixing with Carbon Particles)

3 g of Ketjenblack EC (produced by Lion Corporation) as carbon particles and 280 g of ethanol were mixed. The mixture was dispersed by an ultrasonic homogenizer US-300T (Nippon Seiki Co., Ltd., rated output: 300 W, oscillating frequency: 20 kHz) (irradiation time: 1 minute). The average particle diameter of the dispersed carbon particles was 1.5 μm. This dispersion liquid was mixed with 500 g of the above-mentioned lithium manganate dispersion liquid. The dispersion liquid and the lithium manganate dispersion liquid were stirred and mixed by Disper. At this time, they were stirred and mixed at a stirring speed of 6000 rpm for 1 minute. Thereafter, ethanol as the solvent was removed by an evaporator to obtain a mixture of lithium manganate and carbon particles. The mixture (composite particles) was further dried at 60° C. overnight in a vacuum dryer.

(Firing of Mixture)

After the above-mentioned mixture was lightly milled in a commercially available coffee mill, the mixture was placed in a crucible made of Alumina, and fired in an electric furnace (MS electric furnace: SLA-2025D (production number: MS-0435), manufactured by Motoyama Co., Ltd.). The inner temperature of the furnace reached 800° C. at the average temperature rising rate of 400° C./hour, and the mixture was then fired at 800° C. for 5 hours while air was always flown at the flow velocity of 5 L/min in the furnace. In this process, most of the carbon particles were oxidized and evaporated, and only the sintered lithium manganate particles were left on the positive electrode active material fired body.

(Adjustment of Average Particle Diameter of Positive Electrode Active Material)

30 g of the fired lithium manganate particles and 300 g of ethanol were mixed, and the mixture was then crushed by an ultrasonic homogenizer US-300T (Nippon Seiki Co., Ltd., rated output: 300 W, oscillating frequency: 20 kHz) (ultrasonic wave irradiation time: 5 minute). The mixture was classified by passing the dispersion liquid after crushed through a filter made of SUS of 400 meshes to remove coarse particles. Thereafter, ethanol was removed by the evaporator to obtain lithium manganate particles as a porous positive electrode active material fired body having an average particle diameter of 1.5 μm. Table 1-2 shows results obtained by performing the above-mentioned evaluations using the obtained porous positive electrode active material fired body as the positive electrode active material. The average particle diameter of the positive electrode active material after removing the ethanol was measured by the same measuring method as that of the average particle diameter (d1) of the raw material particles for the positive electrode active material constituting the raw material for the positive electrode active material described above. The concentration of the coating paste was 40% by weight, and the viscosity was 5050 cps.

Example 2

The mixing with carbon particles, the firing of a mixture and the adjustment of the average particle diameter of a positive electrode active material fired body were performed to obtain a porous positive electrode active material fired body using the same conditions as those of Example 1 except for using 3 g of carbon black (#5500 produced by Tokai Carbon Co., Ltd.) as carbon particles in Example 1. Table 1-2 shows results obtained by performing the above-mentioned evaluations using the obtained positive electrode active material fired body. The concentration of the coating paste was 40% by weight, and the viscosity was 5100 cps.

Example 3

The mixing with carbon particles, the firing of a mixture and the adjustment of the average particle diameter were performed to obtain a porous positive electrode active material fired body using the same conditions as those of Example 1 except that the average particle diameter of the positive electrode active material fired body was set to 3 μm by changing the irradiation time of ultrasonic wave to 1 minute when the fired lithium manganate particles were crushed in Example 1. Table 1-2 shows results obtained by performing the above-mentioned evaluations using the obtained positive electrode active material fired body as a positive electrode active material. FIG. 1 shows a graph of a pore distribution of the positive electrode active material fired body of Example 3. As shown in FIG. 1, the positive electrode active material fired body of Example 3 had one peak pore diameter which provided a local maximum differential pore volume in a pore diameter range of 0.01 to 10 μm, and the pore diameter thereof was 0.80 μm. The concentration of the coating paste was 40% by weight, and the viscosity was 4800 cps.

Example 4

The mixing with carbon particles, the firing of a mixture and the adjustment of the average particle diameter of a positive electrode active material fired body were performed to obtain a porous positive electrode active material fired body using the same conditions as those of Example 1 except that the content of Ketjenblack as carbon particles was changed to 7.4% by weight in Example 1. Table 1-2 shows results obtained by performing the above-mentioned evaluations using the obtained positive electrode active material fired body as a positive electrode active material. The concentration of the coating paste was 40% by weight, and the viscosity was 5500 cps. Although not shown in the drawings, the positive electrode active material fired body of Example 4 also had one peak pore diameter which provided a local maximum differential pore volume in a pore diameter range of 0.01 to 10 μm. Similarly, Examples 1, 2 also had one peak pore diameter which provided a local maximum differential pore volume in a pore diameter range of 0.01 to 10 μm (the graph is not shown).

Comparative Example 1

A porous positive electrode active material fired body was obtained using the same conditions as those of Example 1 except that ethanol was removed after milling raw material particles without mixing carbon particles in Example 1, and the raw material particles were fired after vacuum-drying the raw material particles. Table 1-2 shows results obtained by performing the above-mentioned evaluations using the obtained positive electrode active material fired body as a positive electrode active material. The concentration of the coating paste was 40% by weight, and the viscosity was 6000 cps.

Comparative Example 2

After a solvent was removed without firing the lithium manganate particles obtained in "Adjustment of average particle diameter of positive electrode active material" of Example 1 and having an average particle diameter of 0.5 μm, the above-mentioned evaluations of the lithium manganate particles as a positive electrode active material in a dried state were performed. Table 1-2 shows the results. The concentration of the coating paste was 40% by weight, and the viscosity was a value exceeding 1000 cps.

Comparative Example 3

A porous positive electrode active material fired body was obtained using the same conditions as those of Example 1 except that 150 g of polystyrene (Aldrich Corporation, model number 459356, polystyrene concentration: 10% by weight, average particle diameter: 0.1 μm) was used in place of the carbon particles and polystyrene was partially decomposed thermally (temperature: 400° C.×0.5 hour) in place of firing in Example 1. Table 1-2 shows results obtained by performing the above-mentioned evaluations of the obtained porous positive electrode active material as a positive electrode active material. The concentration of the coating paste was 40% by weight, and the viscosity was a value exceeding 10000 cps.

TABLE 1-1

| | Producing condition of positive electrode active material for electrode | | | | | | |
|---|---|---|---|---|---|---|---|
| | Average particle diameter (d1) of raw material particles for positive electrode active material μm | Carbon particles | | | Firing condition | | |
| | | Kind | Average particle diameter μm | Content of carbon particles in mixture Wt % | Temperature rising rate (t) ° C./hr | Firing temperature (T) ° C. | Firing time (H) hr |
| Example 1 | 0.5 | Ketjenblack | 1.5 | 3.8 | 400 | 800 | 5 |
| Example 2 | 0.5 | Carbon black (#5500) | 1.5 | 3.8 | 400 | 800 | 5 |
| Example 3 | 0.5 | Ketjenblack | 1.5 | 3.8 | 400 | 800 | 5 |
| Example 4 | 0.5 | Ketjenblack | 1.5 | 7.4 | 400 | 800 | 5 |
| Comparative Example 1 | 0.5 | | | 0 | 400 | 800 | 5 |
| Comparative Example 2 | 0.5 | | | 0 | | | |
| Comparative Example 3 | 0.5 | Polystyrene | 0.1 | 16.7*) | 400 | 400 | 0.5 |

*)Content of polystyrene in mixture

TABLE 1-2

Characteristics of positive electrode active material for electrode

| | Full width at half maximum of positive electrode active material | | Average particle diameter of positive electrode active material fired body μm | Pore diameter (d2) μm | Pore volume cc/g | BET specific surface area m²/g | Constituent element | Weight change ratio after fired at 600° C. for 1 hour % | d2/d1 | High-rate discharge characteristics % |
|---|---|---|---|---|---|---|---|---|---|---|
| | Before fired | After fired | | | | | | | | |
| Example 1 | 0.35 | 0.16 | 1.5 | 0.68 | 0.48 | 3.1 | Li, Mn, O | Less than 0.5 | 1.3 | 88 |
| Example 2 | 0.35 | 0.17 | 1.5 | 0.57 | 0.40 | 3.6 | Li, Mn, O | Less than 0.5 | 1.1 | 80 |
| Example 3 | 0.35 | 0.16 | 3.0 | 0.80 | 0.52 | 3.0 | Li, Mn, O | Less than 0.5 | 1.6 | 90 |
| Example 4 | 0.35 | 0.16 | 1.5 | 0.60 | 0.70 | 3.2 | Li, Mn, O | Less than 0.5 | 1.2 | 85 |
| Comparative Example 1 | 0.35 | 0.16 | 1.5 | 0.27 | 0.32 | 3.2 | Li, Mn, O | Less than 0.5 | 0.54 | 70 |
| Comparative Example 2 | 0.35 | 0.35 | 0.5 | 0.10 | 0.30 | 10.1 | Li, Mn, O | 2.0 | 0.20 | 10 |
| Comparative Example 3 | 0.35 | 0.31 | 1.2 | 0.27 | 0.05 | 9.3 | Li, Mn, O, trace of C | 1.1 | 0.54 | 20 |

As shown in the results of Table 1-2, Examples 1 to 4 in which the mixture of the carbon particles and the firing of the mixture were performed had a moderately secured pore diameter and pore volume, a narrow full width at half maximum (with enhanced crystallinity), and excellent high-rate discharge characteristics.

On the other hand, in Comparative Example 1 in which the carbon particles were not mixed, the full width at half maximum was also narrowed by the effect of firing. However, the pore diameter and the pore volume became insufficient, and the high-rate discharge characteristics were also reduced. In Comparative Example 2 in which both the mixture of the carbon particles and firing were not performed, the full width at half maximum was large and the pore diameter and pore volume became insufficient. The high-rate discharge characteristics were remarkably reduced. Furthermore, in Comparative Example 3 in which the raw material particles were bound using polystyrene in place of the carbon particles, the full width at half maximum was large and the pore diameter and the pore volume became insufficient. The high-rate discharge characteristics were remarkably reduced.

Comparative Example 4

Figure 2:
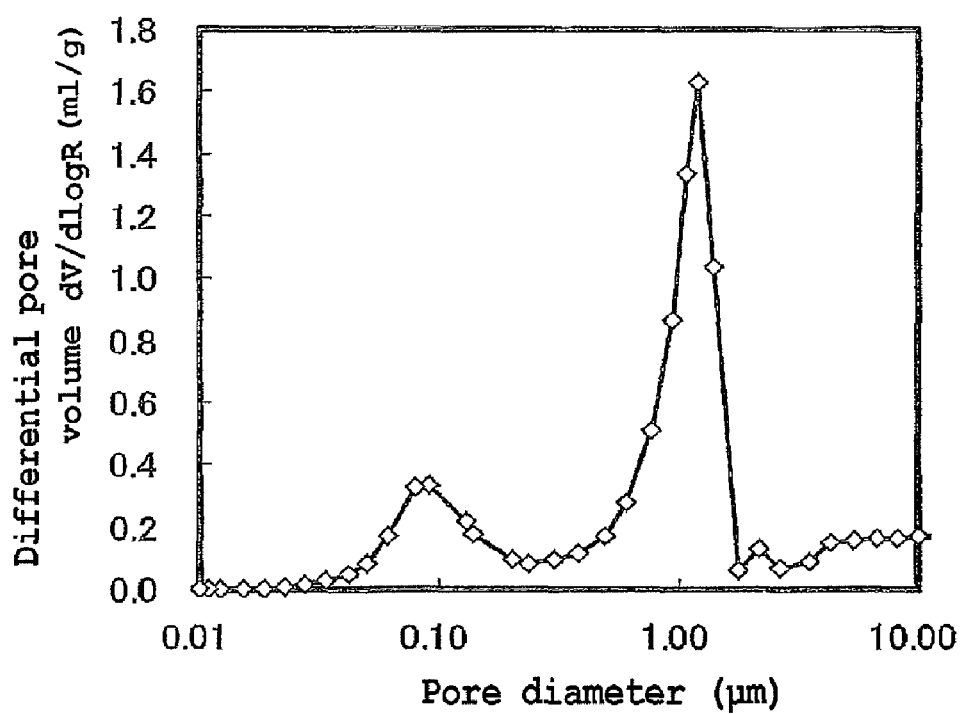
FIG. 2 is a graph of a pore distribution of an active material sintered body finally obtained in Comparative Example 4.

$MnO_2$ (420 g) having an average primary particle diameter of 0.03 μm and an average aggregate particle diameter of 34 μm was mixed in water (2580 g). 7 g of a dispersing agent (Poise 532A produced by Kao Corporation) was added thereto. $MnO_2$ was wet-milled by using Dyno Mill (MULTI LAB TYPE manufactured by Shinmaru Enterprises Corporation, content volume: 0.6 L, 1836 g of zirconia beads having a diameter of 0.2 mm was filled) to obtain slurry of $MnO_2$ having an average primary particle diameter of 0.03 μm and an average aggregate particle diameter of 0.3 μm. Next, 420 g of lithium carbonate having an average primary particle diameter of 25 μm and an average aggregate particle diameter of 84 μm was mixed in 2580 g of water. 20 g of a dispersing agent (Poise 532A produced by Kao Corporation) was added thereto. Lithium carbonate was wet-milled by using Dyno Mill (MULTI LAB TYPE manufactured by Shinmaru Enterprises Corporation, content volume: 0.6 L, 1836 g of zirconia beads having a diameter of 0.2 mm was filled) to obtain slurry of lithium carbonate having an average primary particle diameter of 0.06 μm and an average aggregate particle diameter of 0.4 μm. Next, a mixed solution of 3 g of carbon black (#5500 produced by Tokai Carbon Co., Ltd.), 100 g of water and 0.375 g of a dispersing agent (Poise 532A produced by Kao Corporation) was ultrasonically dispersed for 5 minutes to prepare a carbon black dispersion liquid. 23 parts by weight of the above-mentioned carbon black dispersion liquid was added into 100 parts by weight of the obtained $MnO_2$ slurry and 21.2 parts by weight of the lithium carbonate slurry. They were mixed by Disper, and were then spray-dried under the conditions of a hot wind supply temperature of about 135° C. and an outlet temperature of the dryer of about 80° C. by using a spray dryer (SD-1000 manufactured by Tokyo Rikakikai Co., Ltd.). Then, the temperature of the obtained powder was risen at the temperature rising rate of 400° C./hr, and the powder was fired at 800° C. for 5 hours. FIG. 2 shows a graph of a pore distribution of the fired positive electrode active material of Comparative Example 4. As shown in FIG. 2, the positive electrode active material of Comparative Example 4 had two peak pore diameters which provide a local maximum differential pore volume in a pore diameter range of 0.01 to 10 μm. A coating paste was prepared by the method described above using the fired positive electrode active material of Comparative Example 4. The concentration of the coating paste was 40% by weight, and the viscosity was a value exceeding 10000 cps. The coating paste was coated on a collector and dried. However, after drying, a paste dried object was separated from the collector. It is believed that the binder and the solvent in the coating paste were adsorbed on the pores and particle surface of the positive electrode active material, thereby causing an increase in paste viscosity and exfoliation of the paste dried object.

Comparative Example 5

A lithium carbonate powder (average aggregate particle diameter: 11 μm), an electrolytic manganese dioxide powder (average aggregate particle diameter: 2.7 μm) and boric acid were weighed and mixed so that an elemental ratio of Li:Mn:B=1.1:1.9:0.01 was set. Water was added thereto, producing slurry having a solid content of 15% by weight. The slurry was wet-milled for 10 minutes by using Dyno Mill (MULTI LAB TYPE manufactured by Shinmaru Enterprises Corporation, content volume: 0.6 L, 1836 g of zirconia beads having a diameter of 0.2 mm was filled). The average aggregate particle diameter of the milled slurry was 0.5μ. 4 parts by weight of carbon black (#5500 produced by Tokai Carbon Co., Ltd.) into 100 parts by weight of the solid content of the slurry was added, and water was then evaporated by spray drying. Furthermore, they were fired at 850° C. for 5 hours. When the pore distribution of the fired positive electrode active material of Comparative Example 5 was measured by a mercury porosimeter, the positive electrode active material had two peak pore diameters which provide a local maximum differential pore volume in a pore diameter range of 0.01 to 10 μm as in Comparative Example 4 (the graph is not shown). When the coating paste was prepared by the method described above using the fired positive electrode active material of Comparative Example 5 and the viscosity was measured as in the case of the above-mentioned Example 3, the viscosity was a value exceeding 10000 cps. The coating paste was coated on the collector and dried. However, the paste dried object was separated from the collector after drying.

In Comparative Examples 4 and 5, the average aggregate particle diameter and the average primary particle diameter were measured as follows.

(Average Aggregate Particle Diameter)

A particle size distribution after irradiating ultrasonic waves for 1 minute was measured at a relative refractive index of 1.5 by using a laser diffraction/dispersion type particle distribution measurement device (LA920 manufactured by Horiba, Ltd.) using water as a disperse medium to obtain an average aggregate particle diameter.

(Average Primary Particle Diameter)

A field emission type scanning electron microscope S-4000 (manufactured by Hitachi, Ltd.) was used. Aggregated particles having an average aggregate particle diameter±(average aggregate particle diameter×0.2) of the aggregated particles composed of the aggregated primary particles were selected. The aggregated particles were observed under the above-mentioned microscope, and an SEM image was photographed at the magnification for which 50 to 100 two-dimensional SEM images (hereinafter, referred to as a primary particle image) of the primary particles exist in a microscopic field. 50 primary particle images were extracted from the photographed primary particle images, and the Feret diameter thereof was measured. The average value of 50 Feret diameters was defined as the average primary particle diameter. The Feret diameter of primary particle image of the extracted 50 Feret diameters means a distance between two parallel lines which are most apart from each other in a straight line group parallel to an optional straight line L passing the above-mentioned primary particle image (including contacting). However, the distance between two parallel lines means a length of a line segment of a straight line perpendicular to the two parallel lines cut off by the two parallel lines. When a sample was slurry, the sample with the solvent removed was observed.

The invention claimed is:

1. A method for producing a positive electrode active material for a battery, comprising:
    a step 1 of firing a mixture of a raw material for the positive electrode active material and carbon particles to remove the carbon particles, wherein an inner temperature of a furnace in which the mixture is fired reaches a firing temperature T of 700-900° C. at an average temperature rising rate of 300-600° C./hr and the mixture is fired at the firing temperature T for a firing time H wherein $H=[8500/10^{(1+T/273)}]$ to $[128,000/10^{(1+T/273)}]$ hr; and
    a step 2 of milling and classifying a fired body obtained in the step 1.

2. The method for producing the positive electrode active material for the battery according to claim 1, wherein the positive electrode active material for the battery has a peak pore diameter of 0.3 to 5 μm, the peak pore diameter providing a maximum differential pore volume value in a pore diameter range of 0.01 to 10 μm in a pore distribution measured by a mercury porosimeter; and any peak, which provides a differential pore volume value of not less than 10% of the maximum differential pore volume value, is not present on a smaller pore diameter side than the peak pore diameter.

3. The method for producing the positive electrode active material for the battery according to claim 1, wherein a content of the carbon particles is 0.1 to 30% by weight in the mixture.

4. The method for producing the positive electrode active material for the battery according to claim 1, wherein the raw material for the positive electrode active material is composed of raw material particles for the positive electrode active material having an average particle diameter of 0.1 to 2 μm.

5. The method for producing the positive electrode active material for the battery according to claim 4, wherein a ratio d2/d1 of a pore diameter d2 of the fired body obtained by the firing to an average particle diameter d1 of the raw material particles for the positive electrode active material is 1 to 50.

6. The method for producing the positive electrode active material for the battery according to claim 4, wherein the raw material particles for the positive electrode active material and the carbon particles are dispersed and mixed in a solvent, and the solvent is removed to obtain the mixture.

7. The method for producing the positive electrode active material for the battery according to claim 1, further comprising the step of milling the fired body obtained by the firing so that the average particle diameter is 1 to 10 times as large as the pore diameter of the fired body.

8. The method for producing the positive electrode active material for the battery according to claim 1, wherein the obtained positive electrode active material for the battery is a positive electrode active material for a lithium battery.

9. A method for producing a composition for a battery, comprising a step of preparing slurry obtained by mixing the positive electrode active material for the battery obtained by the method for producing the positive electrode active material for the battery according to claim 1, a conductive material, a binder and a solvent.

* * * * *